United States Patent
Babej et al.

(10) Patent No.: US 10,252,317 B2
(45) Date of Patent: Apr. 9, 2019

(54) DIE BUTTON

(71) Applicant: PROFIL Verbindungstechnik GmbH & Co. KG, Friedrichsdorf (DE)

(72) Inventors: Jiri Babej, Lich (DE); Richard Humpert, Bad Nauheim (DE)

(73) Assignee: PROFIL VERBINDUNGSTECHNIK GMBH & CO. KG, Friedrichsdorf (DE)

( * ) Notice: Subject to any disclaimer, the term of this patent is extended or adjusted under 35 U.S.C. 154(b) by 0 days.

(21) Appl. No.: 15/667,007

(22) Filed: Aug. 2, 2017

(65) Prior Publication Data
US 2017/0326616 A1 Nov. 16, 2017

Related U.S. Application Data

(62) Division of application No. 14/470,372, filed on Aug. 27, 2014.

(30) Foreign Application Priority Data

Aug. 28, 2013 (DE) .......................... 10 2013 217 213

(51) Int. Cl.
*B23P 19/06* (2006.01)
*B21D 39/03* (2006.01)
(Continued)

(52) U.S. Cl.
CPC ............ *B21D 39/035* (2013.01); *B23P 19/04* (2013.01); *B23P 19/062* (2013.01);
(Continued)

(58) Field of Classification Search
CPC ...... B21D 39/035; B21D 53/24; B21D 53/36; B23P 19/04; B23P 19/062; Y10T 29/5343; Y10T 29/49833; F16B 37/062
See application file for complete search history.

(56) References Cited

U.S. PATENT DOCUMENTS

| 3,022,687 A | 2/1962 | Richards |
| 4,555,838 A | 12/1985 | Muller |

(Continued)

FOREIGN PATENT DOCUMENTS

| CA | 902350 A | 6/1972 |
| DE | 3003908 A1 | 8/1981 |

(Continued)

OTHER PUBLICATIONS

English Translation of German Search Report for related German Patent Application No. 10 2013 217 213.3, dated Mar. 19, 2014, 6 pages.

(Continued)

*Primary Examiner* — Jason L Vaughn
*Assistant Examiner* — Amanda J Meneghini
(74) *Attorney, Agent, or Firm* — Cantor Colburn LLP

(57) ABSTRACT

A die button for the punching in and fastening of a fastener element having a piercing section to a planar workpiece, in particular a sheet metal part. The die button includes a jacket. Also included is a die plunger movably arranged in the jacket. Further included is a biasing device for pressing the plunger against the workpiece when the workpiece is supported on the jacket with a pressing force made available by the biasing device and selected such that the die plunger first moves when a slug has been detached from the workpiece by the piercing section of the fastener element.

7 Claims, 11 Drawing Sheets

Figure 1:
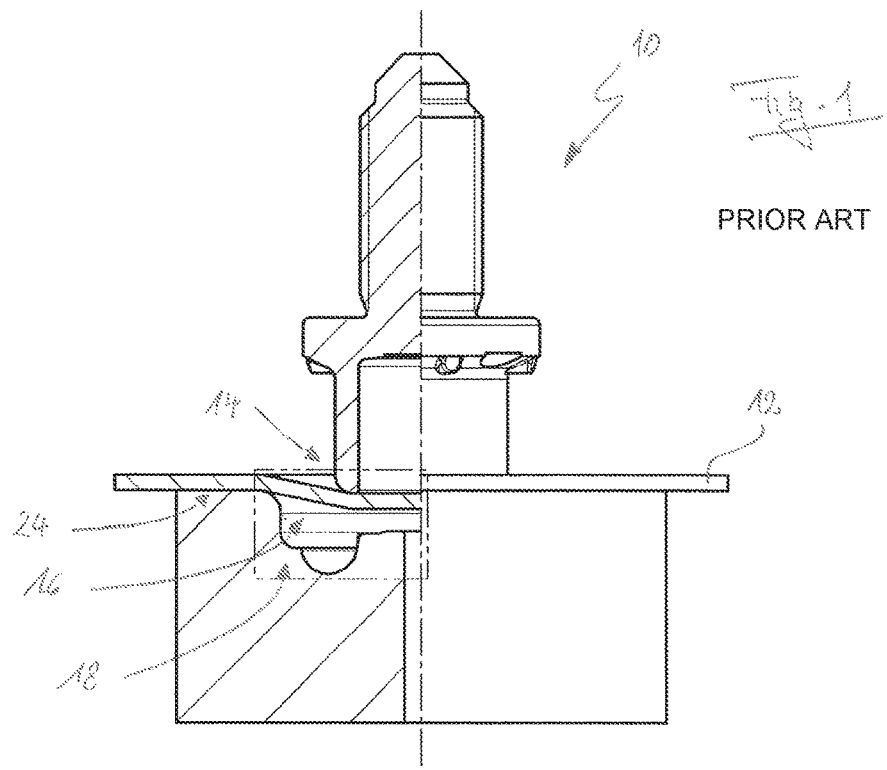

(51) Int. Cl.
*B23P 19/04* (2006.01)
*F16B 37/06* (2006.01)

(52) U.S. Cl.
CPC ....... *F16B 37/062* (2013.01); *Y10T 29/49833* (2015.01); *Y10T 29/5343* (2015.01)

(56) References Cited

U.S. PATENT DOCUMENTS

| | | | |
|---|---|---|---|
| 4,610,072 A | | 9/1986 | Muller |
| 4,633,560 A | * | 1/1987 | Muller ................. B23P 19/062 227/55 |
| 4,727,646 A | | 3/1988 | Muller |
| 4,765,057 A | | 8/1988 | Muller |
| 4,831,698 A | | 5/1989 | Muller |
| 5,560,094 A | * | 10/1996 | Ladouceur ............ B23P 19/062 29/243.518 |
| 6,405,420 B1 | | 6/2002 | Donhauser et al. |
| 2015/0059152 A1 | | 3/2015 | Babej |

FOREIGN PATENT DOCUMENTS

| | | |
|---|---|---|
| DE | 3447006 C2 | 7/1985 |
| DE | 3446978 C2 | 8/1985 |
| DE | 3835566 A1 | 5/1989 |
| DE | 19847980 A1 | 4/2000 |
| DE | 102008005288 A1 | 8/2009 |
| DE | 102010020666 A1 | 11/2011 |
| DE | 102012102860 | 10/2013 |
| EP | 1477249 A1 | 11/2004 |
| JP | 62096946 U | 5/1987 |
| WO | 03029667 A1 | 4/2003 |

OTHER PUBLICATIONS

German Search Report for related German Patent Application No. 102013217213.3, dated Mar. 19, 2014, 5 pages.

* cited by examiner

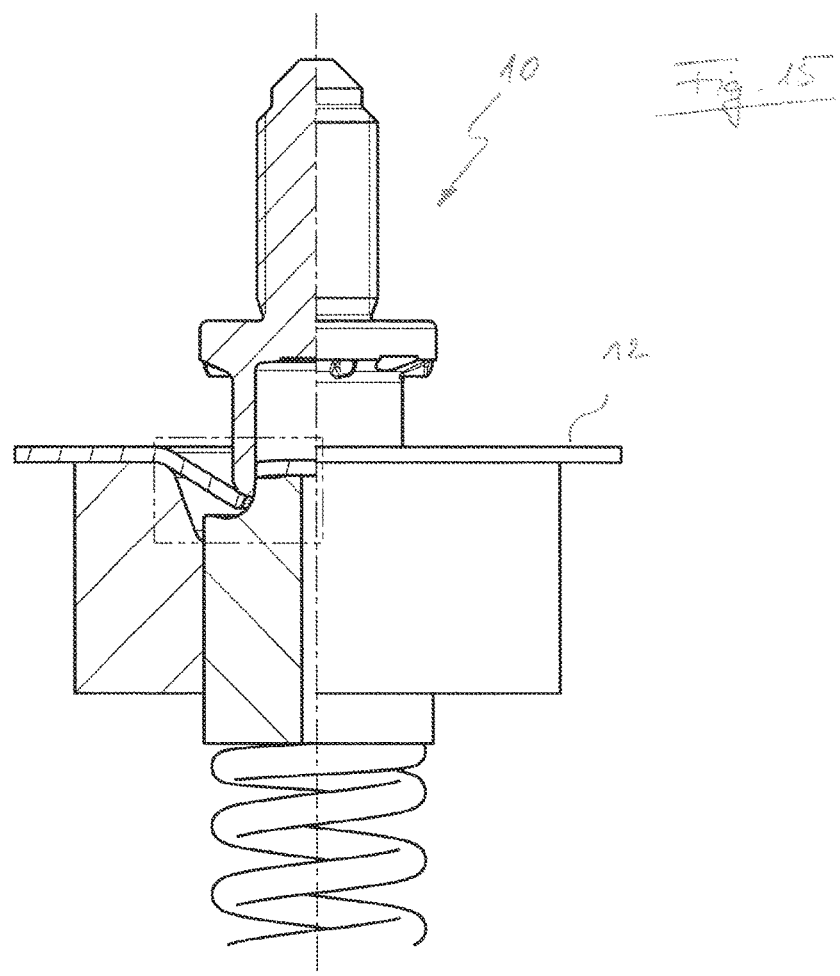
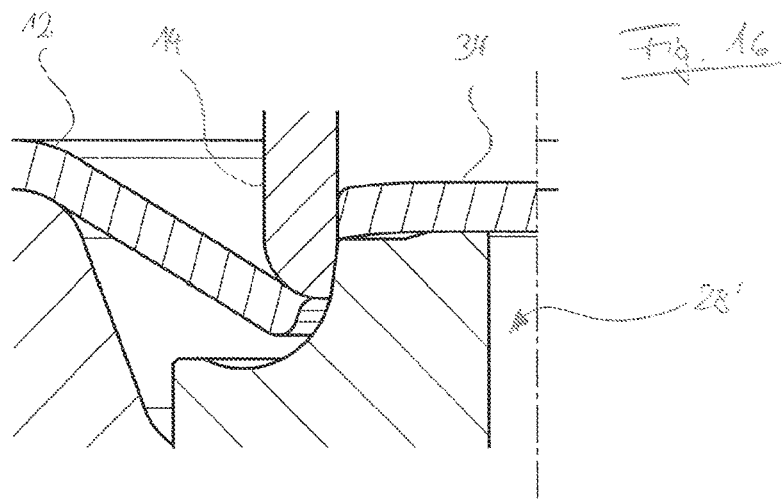

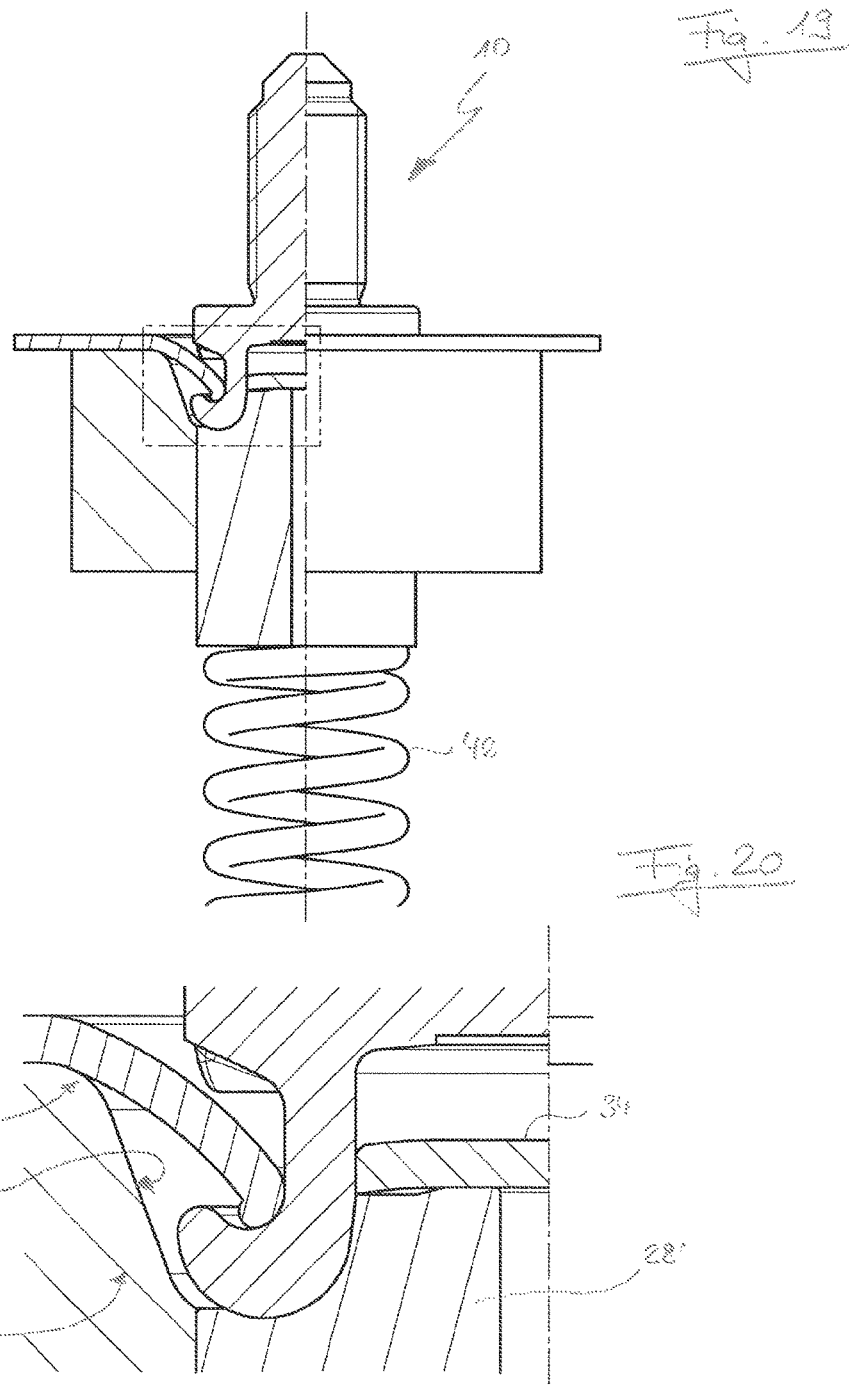

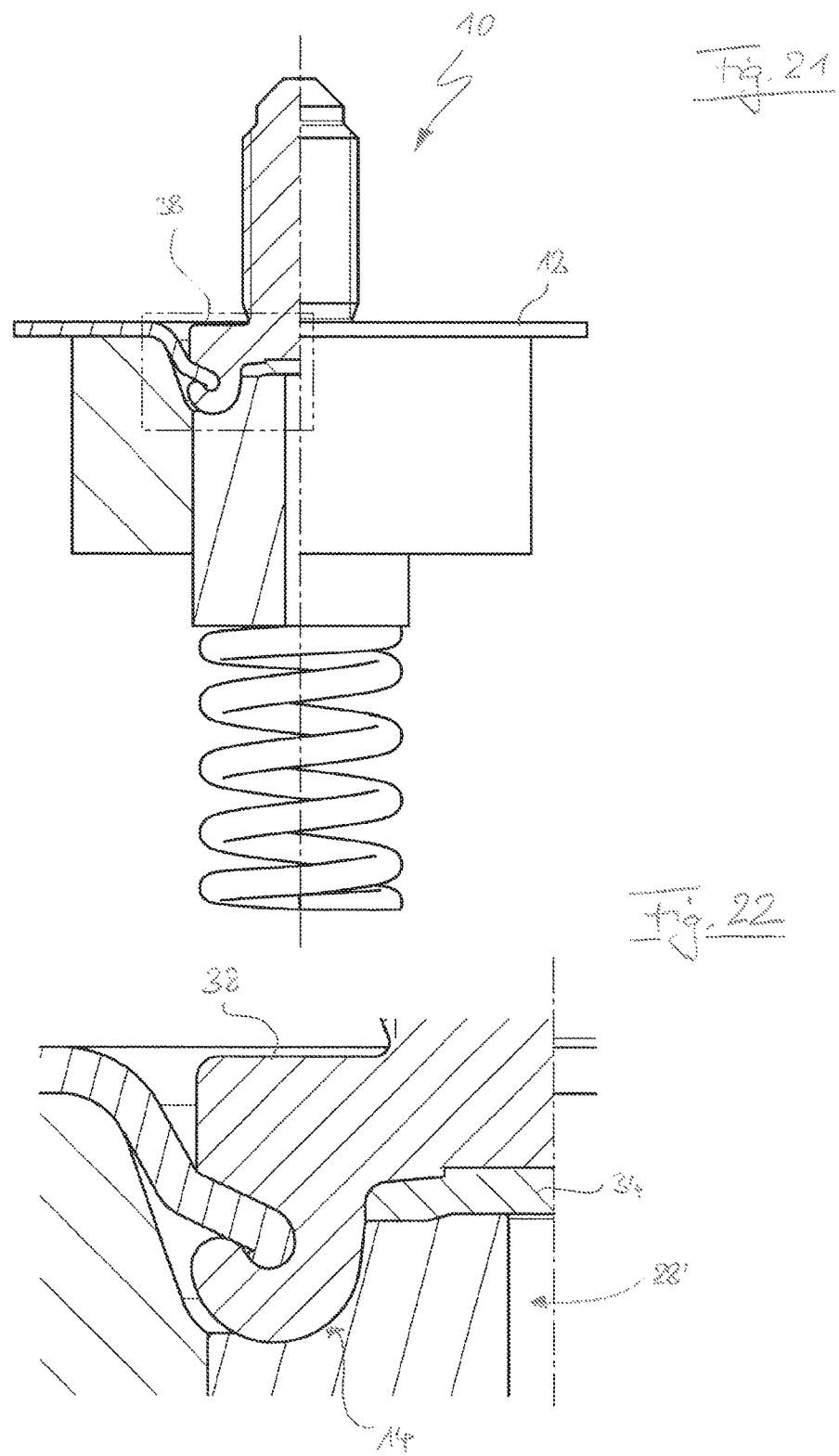

DIE BUTTON

CROSS-REFERENCE TO RELATED APPLICATION

This patent application is a divisional application of U.S. patent application Ser. No. 14/470,372, filed on Aug. 27, 2014, which claims priority to German Patent Application No. DE102013217213.3, filed on Aug. 28, 2013, the disclosures of which are incorporated herein by reference in their entireties.

BACKGROUND

The present invention relates to a die button associated with a method for the punching in and attachment of a fastener element to a planar workpiece, in particular to a sheet metal part.

During the punching in of the fastener element into a workpiece the problem frequently arises that swarf is generated by the punching process and disadvantageously affects the reliability of the attachment of the element. The swarf is often jammed between a rivet section, which is beaded over during or after the actual punching in of the fastener element for its attachment to the workpiece, and the workpiece. In some cases, the swarf also remains lying in a die button which is used for the punching in and the beading over of the rivet section. The swarf is then lifted with the punched in fastener element secured to the workpiece out of the die button and subsequently migrates as a foreign body through the tooling and can lead to ugly impressions in the finished component assembly in the further course of the manufacture of a component.

It is thus an object of the present invention to provide a method of the initially named kind in which the creation of swarf is avoided.

The solution of this object takes place by a method having the features of claim 1.

In accordance with the invention a movably arranged die plunger of the die button is pressed with a predetermined pressing force against the workpiece during the punching in of the fastener element into the workpiece. The pressing force is adapted during this in such a way that the die plunger first moves when a slug has been cut out of the workpiece by a piercing section of the fastener element.

It has namely been recognized by the inventors that, in a customary punching in process, the piercing and rivet section of the fastener element first creates a depression in the workpiece which projects into the die button. In this connection the workpiece is strongly stretched at the side opposite to the piercing and rivet section. A crack arises at the position of the smallest banding radius of the elongated region and does not necessarily coincide with a cut edge of the slug to be cut out by the die button and the piercing and riveting section. This signifies that during the punching in process a bur, in particular a ring-shaped burr, arises which causes the initially named problems.

In accordance with the invention this problem is prevented in that the workpiece is supported during the punching in process in which the slug is cut out from the workpiece. This is achieved by the die plunger which is pressed against the workpiece from a side of the workpiece opposite to the fastener element which is to be punched in. In this way, the creation of the depression which initially occurs in the customary process is avoided. Only when the cutting process associated with the punching in is finished, i.e. as soon as the slug has been substantially completely separated from the workpiece is a movement of the die plunger permitted. Basically, provision can be made that a movement of the die plunger is first permitted after the completion of the cutting process. It is however also possible to provide a movement of the die plunger after a delay time, i.e. when a certain portion of the piercing section of the fastener element has already passed through the workpiece. The direction of movement of the die plunger takes place during this in the direction of movement of the fastener element.

It is also basically possible for the die plunger to be actively moved. A passive movement of the die plunger is however preferred. In this connection, one exploits the fact that forces vary which occurring the punching in process. The predetermined pressing force can thus be selected such that a movement of the die plunger automatically first arises in specific states, i.e. specifically first after the slug has been punched out of the workpiece by the fastener element and the forces acting between the die plunger and the fastener element exceed the pressing force.

Further embodiments of the method of the invention are set forth in the description, in the claims and in the accompanying drawings.

In accordance with one embodiment of the method, the die plunger is movable in a direction parallel to a punching in movement of the fastener element. The pressing force, i.e. the force with which the die plunger is biased towards the workpiece is in particular directed antiparallel to the punching in movement of the fastener element. The pressing force can be selected in such a way that the die plunger is first moved when a fastener section of the fastener element is deformed by a shaping surface of the die plunger, i.e. the preset force is so large that the die plunger is first set in motion when, as a result of the shaping of a section of the fastener element, for example a part of the piercing section acting as a rivet section, the forces which occur exceed the pressing force.

In accordance with an embodiment of the method the die plunger has a raised portion which at the start of the punching in process projects out of the plane which is defined by a rim of a recess of the die button. In other words, the die plunger supports the workpiece during the punching in not only in a plane which is defined by a workpiece support surface on which the workpiece lies during the process. The raised portion of the die plunger ensures that a center part of the slug which is to be punched out is be pressed towards the fastener element which is to be punched in. This facilitates the cutting during the penetration of the piercing section into the workpiece. In particular the die plunger includes a cutting edge which at the start of the punching in process lies in a plane which is defined by the rim of the recess of the die button.

In accordance with one embodiment a movement of the die plunger opposite to and/or in the direction of the pressing force is restricted by an abutment in order, on the one hand, to fix a well-defined position of the die plunger prior to the punching in of the fastener element and, on the other hand, to ensure a controlled attachment of the fastener element to the workpiece by fixing a maximum deflection of the die plunger.

The die plunger can have a shaping surface through which the piercing section is at least regionally deformed radially outwardly. For example, the piercing section which also serves as the rivet section is beaded outwardly by the shaping surface. The shaping surface can be conically and/or concavely shaped, at least regionally.

Provision can be made that during the punching in and attachment of the fastener element a depression is generated which at least partly receives a flange of the fastener element which contacts the workpiece in the end state. The depression is in particular at least so deep that the flange does not project in the axial direction out of the depression.

The predetermined pressing force can be selected in dependence of the properties of the workpiece in dependence on the properties of the fastener element and/or in dependence on a pressing force with which the fastener element is pressed by a pressing unit towards the workpiece, in order to ensure that a reliable support of the workpiece is present in the region of the slug which is to be cut out during the cutting process on the punching in of the fastener element.

Thus, a premature creation of a depression which stretches the material of the workpiece and thus leads to the creation of swarf is avoided.

An adjustable biasing device can be associated with the die plunger with which the predetermined pressing force is adjustable.

The invention further relates to a die button for the punching in and attachment of the fastener element to a planar workpiece, in particular to a sheet metal part in accordance with a method in accordance with at least one of the previously described embodiments, with the moveably arranged die plunger being capable of being pressed by a pressing device against the workpiece and wherein a pressing force made available by the biasing device is selected such that the die plunger first moves when a slug has been cut out by the piercing section of the fastener element. The direction of movement of the die plunger takes place during this in the direction of movement of the fastener element.

In accordance with one embodiment the predetermined pressing force generated by the biasing device is adjustable.

The biasing device in particular includes a spring. The biasing device can be designed both as a mechanical spring, such as a coil spring, and also as a pneumatic spring, for example a pneumatically actuated piston in cylinder arrangement or as a hydraulic spring, for example a hydraulically actuated piston in cylinder arrangement, or as a (movable) latch element. Moreover, the die plunger can be moved by an actuator between the two preset positions which represents an equivalent of the biasing device and which can for example be realized in an electrical pneumatic or hydraulic manner.

DRAWINGS

The present invention will now be described purely by way of example in the following with reference to an advantageous embodiment of the invention and to the accompanying drawings. There are shown:

FIGS. 1 to 10 a customary method for the punching in and attachment of a fastener element to a planar workpiece and FIGS. 11 to 22 an embodiment of the method of the present invention.

Figure 2:
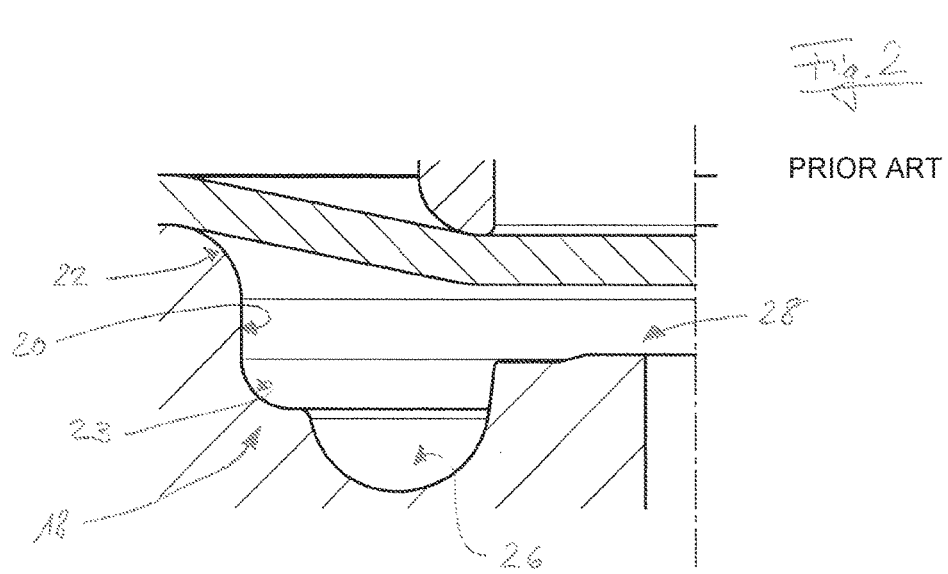
Figure 3:
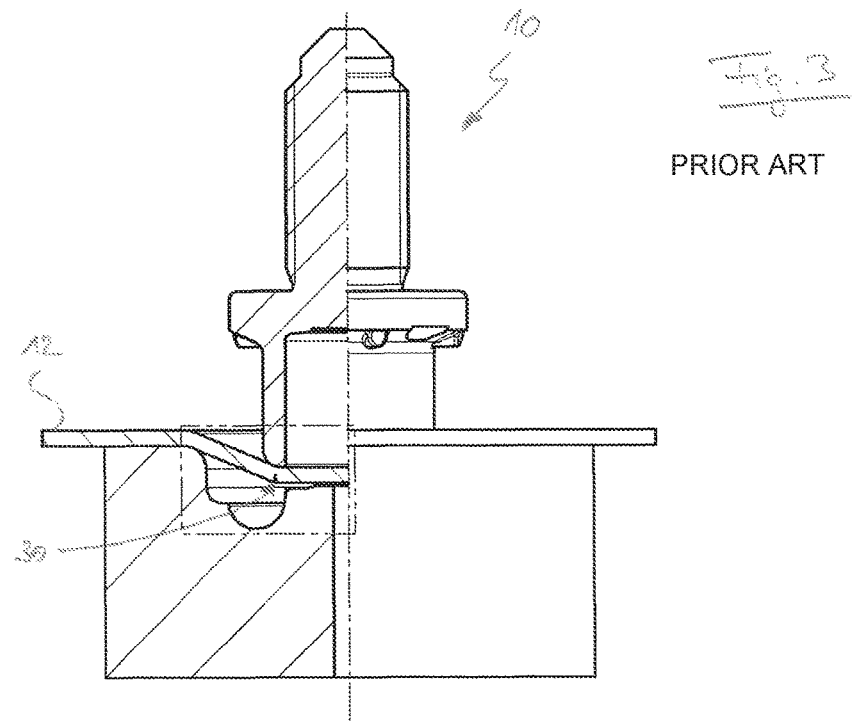
Figure 4:
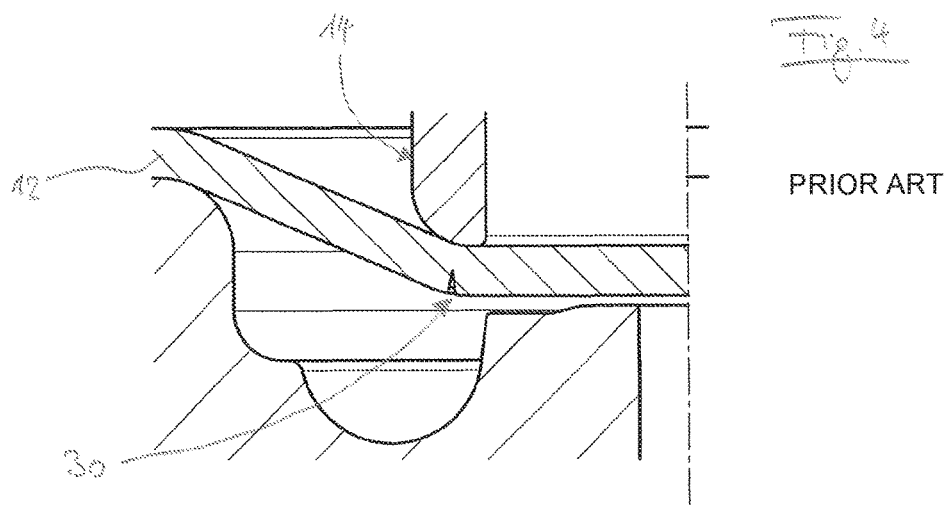
Figure 5:
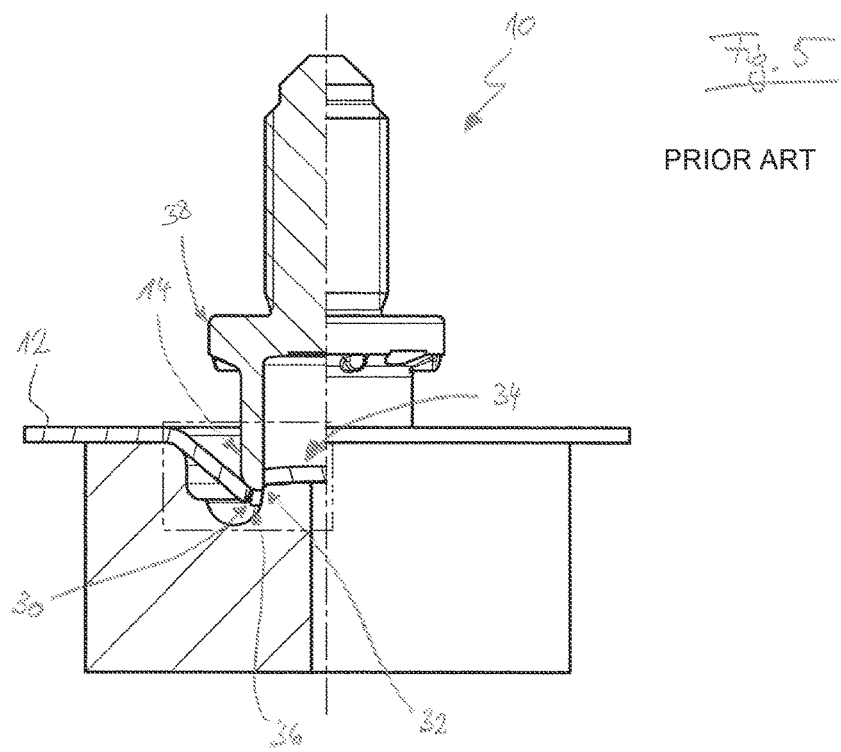
Figure 6:
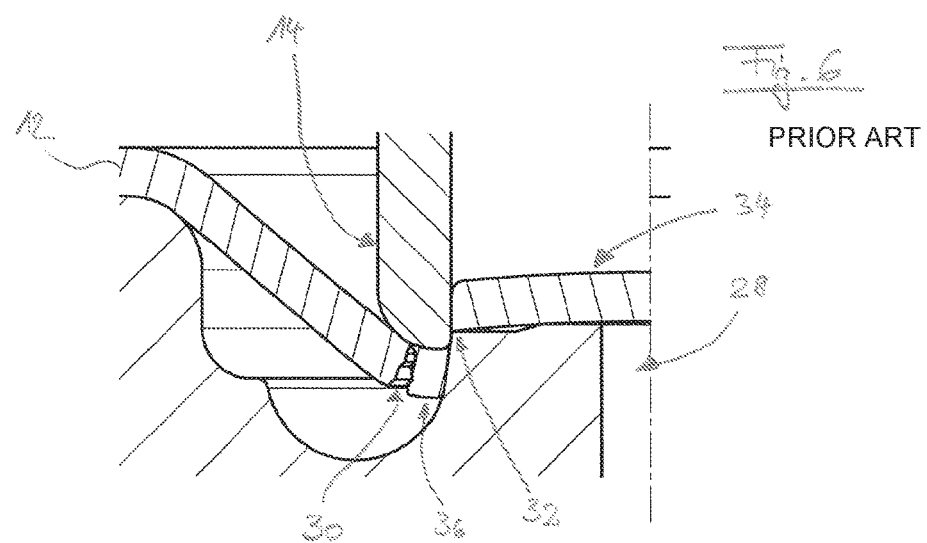
Figure 7:
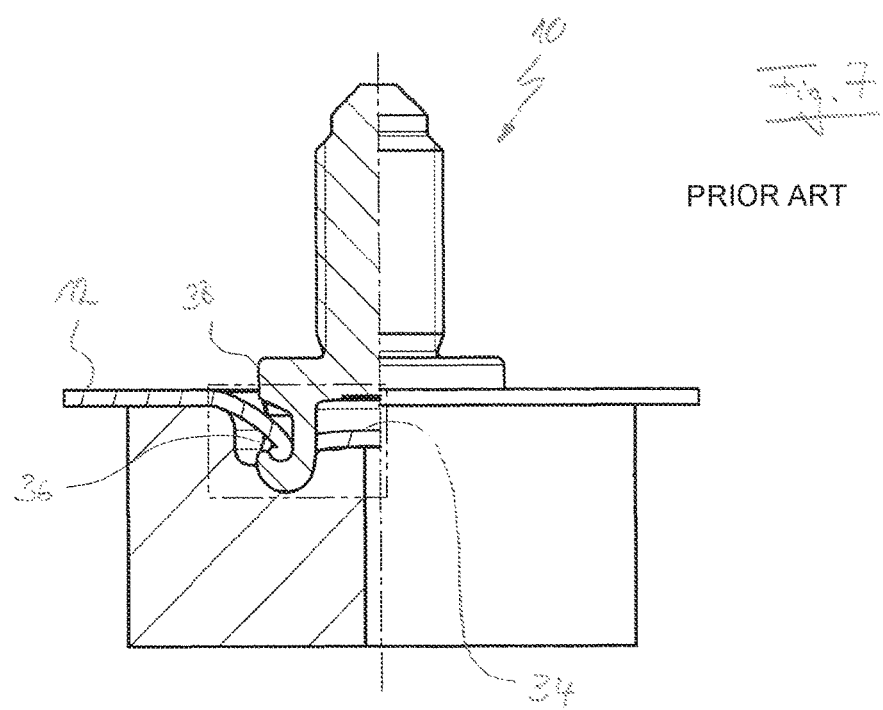
Figure 8:
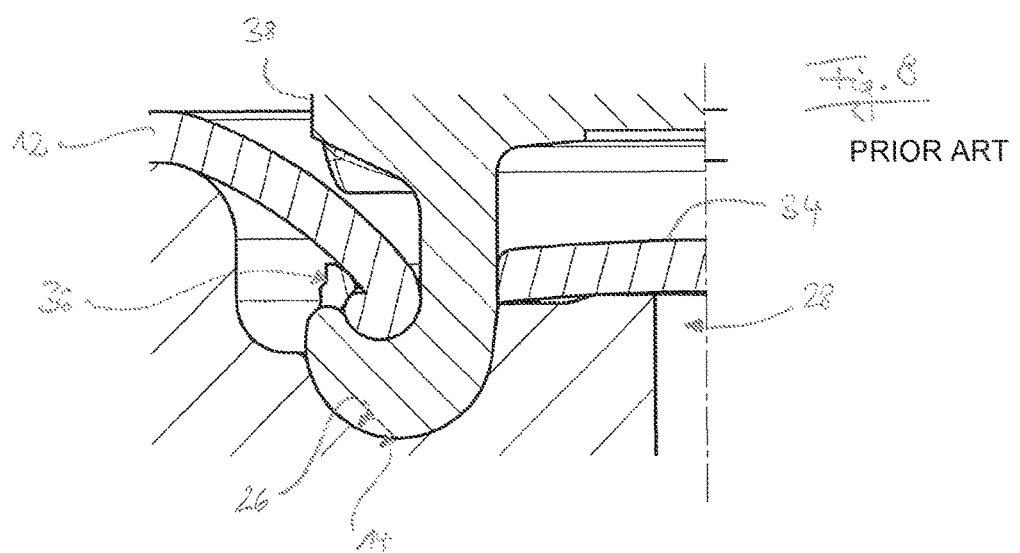
Figure 9:
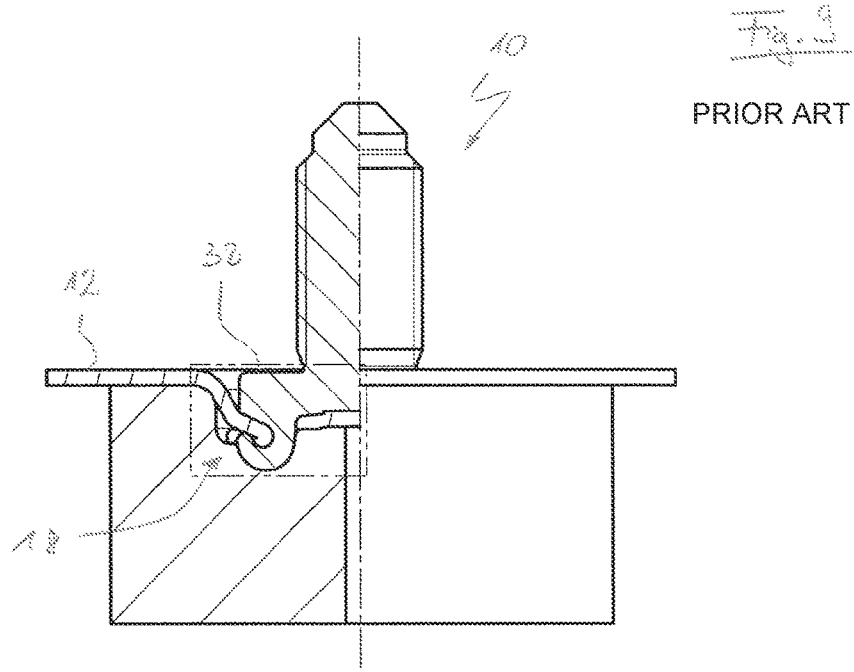
Figure 10:
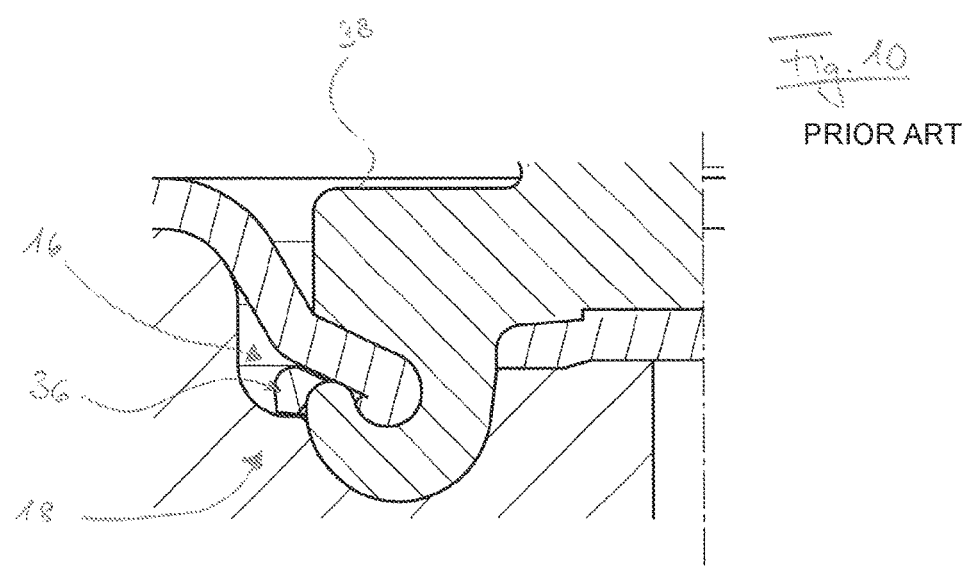
Figure 11:
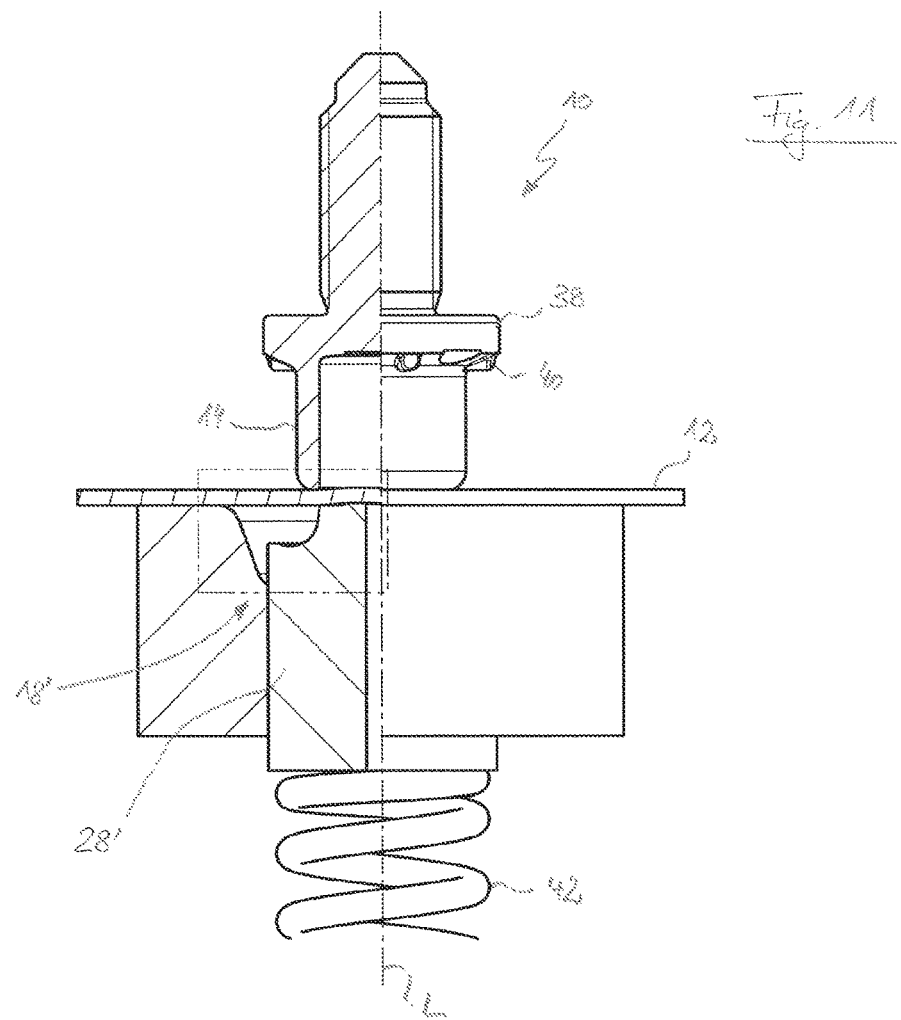
Figure 12:
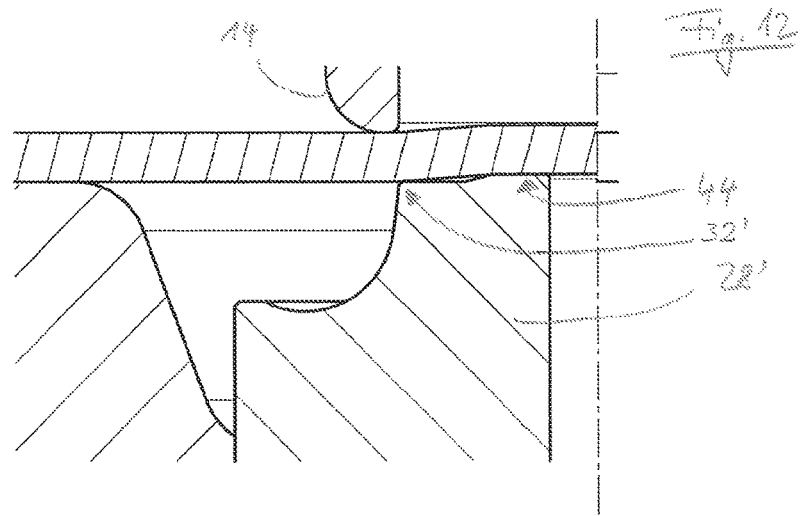
Figure 13:
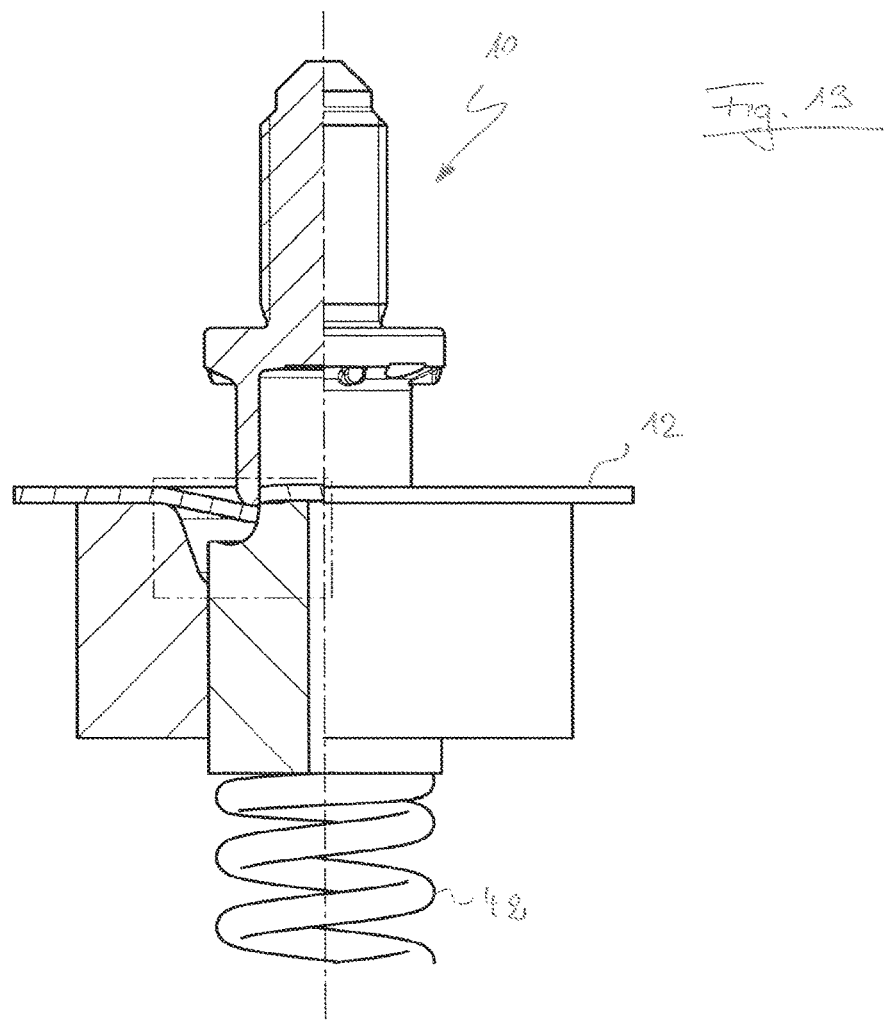
Figure 14:
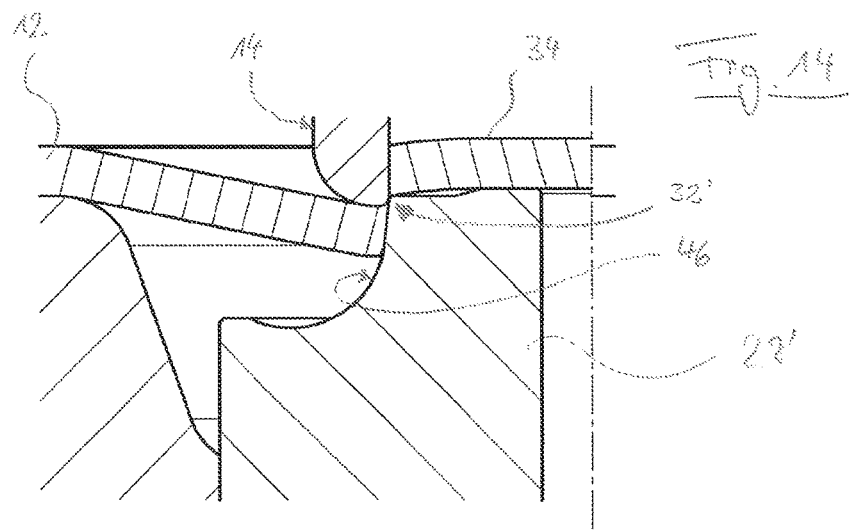
Figure 17:
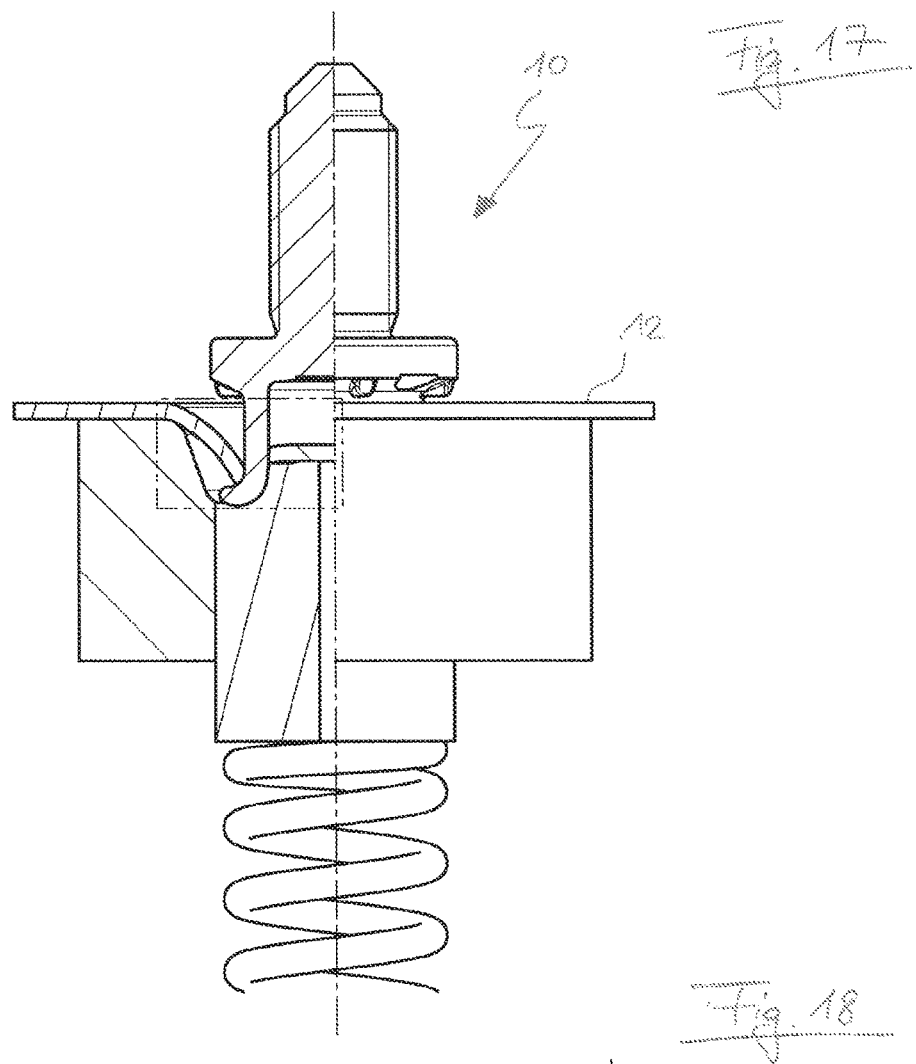
Figure 18:
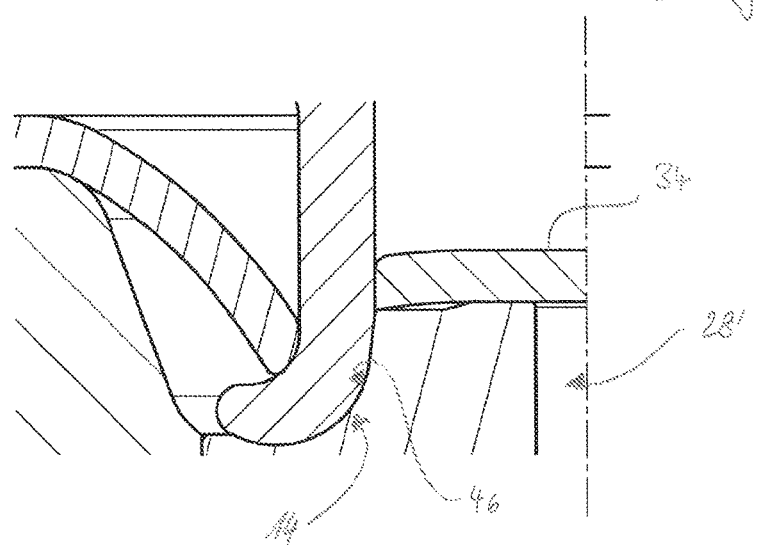

More precisely, there is shown:

FIG. 1 a bolt element which is punched into a planar sheet metal part 12, FIG. 2 the section characterized in broking lines in FIG. 1 in an enlarged representation, FIG. 3 a representation similar to FIG. 1 but in a further advanced state of the attachment of the bolt element, FIG. 4 an enlarged representation of the central region of FIG. 3, FIG. 5 the tearing of the sheet metal part in accordance with a further advanced state of the attachment of the bolt element, FIG. 6 an enlarged representation of the central region of FIG. 5, FIG. 7 the creation of a burr in an advanced state of the attachment of the bolt element, FIG. 8 an enlarged representation of the central region of FIG. 7, FIG. 9 the completion of the connection of the bolt element to the sheet metal part, FIG. 10 an enlarged representation of the central region of FIG. 9, FIG. 11 a representation of the start of the attachment of the bolt element to a sheet metal part using the method in accordance with the invention and using the die button in accordance with the invention, FIG. 12 an enlarged representation of the central region of FIG. 11, FIG. 13 a representation of the method in accordance with the invention directly after the formation of the piercing slug, FIG. 14 an enlarged representation of the central region of FIG. 13, FIG. 15 a representation similar to FIG. 13, but after the initial movement of the die plunger, FIG. 16 an enlarged representation of the central region of FIG. 15, FIG. 17 a representation similar to FIG. 15 but after a further movement of the die plunger, FIG. 18 an enlarged representation of the central region of FIG. 17, FIG. 19 a representation similar to FIG. 17 but shortly before the completion of the formation of the rivet bead, FIG. 20 an enlarged representation of the central region of FIG. 19, FIG. 21 a representation similar to FIG. 19 but after the termination of the formation of the rivet bead and the attachment of the bolt element to a sheet metal part, FIG. 22 an enlarged representation of the central region of FIG. 21.

DETAILED DESCRIPTION

FIG. 1 shows a bolt element 10 which is to be punched into a planar sheet metal part 12 and secured to it. It will be understood that instead of the bolt element a nut element, a hollow rivet or another self-piercing element can be used.

The piercing section 14 of the bolt element 10 starts in the state shown in FIG. 1 to press the sheet metal part 12 into a recess 16 of the die button 18 whereby the formation of a depression sets in.

FIG. 2 shows the section shown in broken lines in FIG. 1 in an enlarged representation. The die button 18 includes a die button jacket 20 merges via a rounded section 22 forming the rim of the recess 16 into a sheet metal support surface 24 (see also FIG. 1). The sheet metal part 12 lies on the sheet metal support surface 24 during the punching in and attachment process.

At the end of the recess 16 remote from the sheet metal support surface 24 the die button jacket 20 merges into a further rounded section 23 which is in turn followed at the radially inner side by a die plunger 28 surrounded by a ring groove 26.

It can be seen from FIGS. 3 and 4 that with increasing depth of the depression a crack 30 forms in the sheet metal part 12 because the material here is particularly strongly extended by the piercing section 14.

The crack 30 propagates—as shown in FIGS. 5 and 6—until it has completely passed through the sheet metal part 12. It can be seen that the crack 30 does not normally arise at the position where the piercing section 14 in conjunction with the cutting edge 32 of the die plunger 28 leads to a cutting through of the sheet metal part 12 and thus to the generation of a slug 34. Accordingly, a ring-like burr 36 arises which, during a beading over of the piercing section 14 acting as a rivet section through the section of the ring groove 26, is jammed between the piercing section 14 and a side of the sheet metal part 12 remote from a flange 38 of the bolt element 10 (see FIGS. 7 and 8).

In many cases the burr 36 remains between the sheet metal part 12 and the surrounding piercing section 14. Often it is however forced outwardly by a further pressing action 10 against the die button 18 which is shown in FIGS. 9 and 10. The burr 36 then either remains in the recess 16 of the die button 18, where it disturbs the subsequent punching in processes, or it is likewise removed from the die button 16 during the removal of the component assembly consisting of the sheet metal part 11 and the bolt element 10 and then wanders through the tooling as a disturbing foreign body.

The method which is described with reference to FIGS. 11 and 22 reliably prevents the creation of swarf 36.

As in the customary method a bolt element 10 can be used which is provided with features 40 providing security against rotation at the flange 38 which is to be brought into contact with the sheet metal part 12. The method of the invention can however be carried out with any desired self-piercing elements.

As can be seen in FIG. 11, the die button 18' of the invention has a movable die plunger 28' which, at the start of the punching in and attachment process is pressed against the sheet metal part 12 from the side remote from the bolt element 10. The pressing force which acts coaxially to a longitudinal axis L of the bolt element 10 and of the plunger 28' is made available by a spring 42. It will be understood that instead of the spring 42 other devices can be used which can generate a predetermined pressing force, such as for example hydraulic and/or pneumatic systems.

The sheet metal part is supported in a central region of the slug 34 to be punched out by the die plunger 28'. In FIG. 12 it can be seen that a raised portion 44 of the die plunger 28' projects in the illustrated basic state somewhat beyond the sheet metal contact surface 24 or the rim of the recess 16 of the die button 18. The sheet metal part is thereby bent slightly in this region towards the bolt element 10 in order to assist the cutting out of the slug 34 by the piercing section 14 and the cutting edge 32'. The cutting edge 32' lies in the illustrated state in the above-named plane.

As can be recognized in FIGS. 13 and 14 the pressing force made available by the spring 42 is selected such that during the cutting out of the piercing slug 34 from the sheet metal part a movement of the die plunger 28' downwardly does not take place. The die plunger 28' does the latter deflect downwardly as is shown in FIGS. 15 and 16 only when a shaping of the piercing section 14 starts as a result of the shaping of the shaping surface 46 of the die plunger 28' and thereby correspondingly large forces act between the piercing section 14 and the die plunger 28'.

In other words, the pressing force is so selected, taking account amongst other things of the properties of the sheet metal part 12 and/or of the element 10, that the slug 34 which is created is supported throughout the entire piercing process. A movement of the die plunger 28' is first provided only after the slug 34 has been completely cut out of the sheet metal part 12. When this first starts depends, amongst other things, on the shape of the peripheral surface 46 and the pressing force which is set. Provision can, for example, be made that the reshaping of the piercing section 14 first takes place comparatively late and a plunger 28' is not set in movement directly after the punching out of the slug 34.

The start of the reshaping process of the piercing slug 14 is shown in FIGS. 15 and 16. As a result of the thereby enhanced coupling of the section 14 and of the die plunger 28' a larger proportion of the pressing force acting on the bolt element 10 is transmitted to the plunger 28' so that the pressing force is overcome and the plunger 28' starts to deviate downwardly.

In FIGS. 17 and 18 a state is shown in which the die plunger 28' has reached a lower end position. I.e. it has reached an abutment position, so that the plunger 28' no longer moves. The piercing section 14 has been pierced over outwardly concave design of the reshaping surface 46 in the lower parts. The concave section of the reshaping surface 46 thus forms a component comparable with the ring groove 26 which serves for the beading over of the piercing section 14, which can also be seen in FIGS. 19 to 22. It will be understood that the design of the die button jacket 20' of the die button 18' can be matched to the respectively present requirements. The same also applies to the rounded rim portion 22' which corresponds functionally to the rounded section 22 of the die button 18.

It can be seen in FIGS. 21 and 22 that the final end state resembles the state shown in FIGS. 9 and 10 to the extent that the flange 38 is received in the axial direction by a depression formed by the punching in and attaching process. The method of the invention thus serves for crack avoidance and thus a burr—avoiding support of the slug 34 to be cut out at the start of the method and simultaneously permits the formation of a depression which receives the flange 38. In accordance with the invention it has been recognized that the pressing force of the supporting die plunger 28' must be selected such that a movement of the die plunger 28' is first permitted after the cutting out of the piercing slug 34.

REFERENCE NUMERAL LIST 10 bolt element
12 sheet metal part
14 piercing section
16 recess
18, 18' die button
20, 20' die button jacket
22, 23, 22' rounded portion
24 sheet metal contact surface
26 ring groove
28, 28' die plunger
30 crack
32 cutting edge
34 slug
36 burr, swarf
38 flange
40 feature providing security against rotation
42 spring
44 raised portion
46 reshaping surface
L longitudinal axis

The invention claimed is:

1. A die button for the punching in and fastening of a fastener element having a piercing section to a planar workpiece, in particular a sheet metal part, the die button comprising:
   a jacket;
   a die plunger having a curved shaping surface engageable with the piercing section for shaping of the piercing section, the die plunger movably arranged in the jacket, the die plunger having a raised portion projecting beyond a contact surface of the sheet metal part or beyond a rim of a recess of the die button; and
   a biasing device for pressing the plunger against the workpiece when the workpiece is supported on the jacket with a pressing force made available by the biasing device and selected such that the die plunger first moves when a slug has been detached from the workpiece by the piercing section of the fastener element and prior to completion of deformation of the fastener element.

2. A die button in accordance with claim 1, wherein the pressing force generated by the biasing device is adjustable.

3. A die button in accordance with claim 1, wherein the biasing device is formed from one of the devices of the group comprising a mechanical spring, a coil spring, a pneumatic spring, a hydraulic spring and a latch element.

4. A die button in accordance with claim 1, wherein the movably arranged die plunger is movable by an actuator between an advanced position in which the die plunger supports the workpiece during the production of the piercing slug and a retracted position serving for the formation of a rivet bead.

5. A die button in accordance with claim 3, wherein the spring is a pneumatic spring and comprises a pneumatically actuated piston in cylinder arrangement.

6. A die button in accordance with claim 3, wherein the spring is a hydraulic spring and comprises a hydraulically actuated piston in cylinder arrangement.

7. A die button in accordance with claim 4, wherein the actuator is one of a hydraulic actuator, a pneumatic actuator and an electrical actuator.

* * * * *